(12) United States Patent
Poloni (10) Patent No.: US 11,555,460 B2
(45) Date of Patent: Jan. 17, 2023

(54) MASS FLOW MEASUREMENT SYSTEM USING ADAPTIVE CALIBRATION AND SENSOR DIAGNOSTICS

(71) Applicant: Garrett Transportation I Inc., Torrance, CA (US)

(72) Inventor: Tomas Poloni, Malinovo (CZ)

(73) Assignee: Garrett Transportation I Inc., Torrance, CA (US)

(*) Notice: Subject to any disclaimer, the term of this patent is extended or adjusted under 35 U.S.C. 154(b) by 0 days.

(21) Appl. No.: 17/546,789

(22) Filed: Dec. 9, 2021

(65) Prior Publication Data

US 2022/0106920 A1 Apr. 7, 2022

Related U.S. Application Data

(63) Continuation of application No. 17/064,007, filed on Oct. 6, 2020, now Pat. No. 11,220,967.

(51) Int. Cl.
*F02D 41/00* (2006.01)
*F02M 26/47* (2016.01)
(Continued)

(52) U.S. Cl.
CPC ....... *F02D 41/0077* (2013.01); *F02D 41/005* (2013.01); *F02D 41/0072* (2013.01);
(Continued)

(58) Field of Classification Search
CPC .............. F02D 41/0077; F02D 41/005; F02D 41/0072; F02D 41/26; F02D 41/222;
(Continued)

(56) References Cited

U.S. PATENT DOCUMENTS 5,806,308 A 9/1998 Khair et al.
6,511,154 B2 1/2003 Niedermeyer et al.
(Continued)

FOREIGN PATENT DOCUMENTS

DE 10158250 A1 6/2003
FR 3085432 A1 3/2020
WO 0175287 A1 10/2001

OTHER PUBLICATIONS

Extended European Search Report dated Feb. 17, 2022, issued in EP 21193117.5, 9 pages.

*Primary Examiner* — George C Jin
(74) *Attorney, Agent, or Firm* — Seager, Tufte & Wickhem, LLP (57) ABSTRACT

New and/or alternative approaches to determine mass flow using a flow measurement device in a pulsatile flow context. The flow measurement device is configured to generate a delta-pressure measurement. A semi-physical valve model is generated for the flow measurement device, and the delta-pressure measurement is then is isolated using the model. A discharge coefficient map is determined for the flow measurement device by testing using sets of operating parameters for a system. The operating parameters of the system are then used to determine the discharge coefficient for use in estimating mass flow with the semi-physical valve model. The resultant estimated mass flow can be used to control the system, and a Factor of Effective Area estimate generated using the valve model can be used to determine the status of the flow measurement device and identify or predict a need for maintenance.

18 Claims, 8 Drawing Sheets

(51) Int. Cl.
  *G01F 25/10* (2022.01)
  *F02D 41/26* (2006.01)
  *G01F 1/42* (2006.01)
  *G01F 1/44* (2006.01)
  *G07C 5/00* (2006.01)

(52) U.S. Cl.
  CPC ............. *F02D 41/26* (2013.01); *F02M 26/47* (2016.02); *G01F 1/42* (2013.01); *G01F 1/44* (2013.01); *G01F 25/10* (2022.01); *G07C 5/006* (2013.01); *F02D 2200/0406* (2013.01); *F02D 2200/101* (2013.01)

(58) Field of Classification Search
  CPC ............. F02D 41/0052; F02D 41/1401; F02D 2200/0406; F02D 2200/101; F02D 2041/1417; F02D 2041/1433; G01F 1/42; G01F 1/44; G01F 25/10; G07C 5/006
  See application file for complete search history.

(56) References Cited

U.S. PATENT DOCUMENTS

| | | | |
|---|---|---|---|
| 6,655,201 | B2 | 12/2003 | Masson et al. |
| 6,866,030 | B1 | 3/2005 | Sun et al. |
| 7,188,534 | B2 | 3/2007 | Tombs et al. |
| 9,291,116 | B2 | 3/2016 | Lahti et al. |
| 9,488,509 | B2 | 11/2016 | Baessler |
| 9,689,335 | B2 | 6/2017 | Ge |
| 10,107,495 | B2 | 10/2018 | Minto |
| 2006/0260299 | A1* | 11/2006 | Wang ............... F01N 3/035 60/297 |
| 2007/0119172 | A1* | 5/2007 | Barbe ............... F02D 41/005 60/605.1 |
| 2015/0090236 | A1* | 4/2015 | Chen ............... F02M 26/47 123/568.21 |
| 2016/0131089 | A1 | 5/2016 | Lahti et al. |
| 2018/0320611 | A1 | 11/2018 | Glugla |
| 2019/0271274 | A1 | 9/2019 | Pachner et al. |
| 2020/0240344 | A1 | 7/2020 | Buchholz et al. |
| 2020/0400106 | A1 | 12/2020 | Hakeem et al. |

* cited by examiner

MASS FLOW MEASUREMENT SYSTEM USING ADAPTIVE CALIBRATION AND SENSOR DIAGNOSTICS

RELATED APPLICATIONS

This application is a continuation of U.S. patent application Ser. No. 17/064,007 filed Oct. 6, 2020, the entirety of which is incorporated by reference.

FIELD

Systems for monitoring and measuring mass flow through an orifice, tube or nozzle, including such systems as used in engine control and performance management.

BACKGROUND

Figure 2:
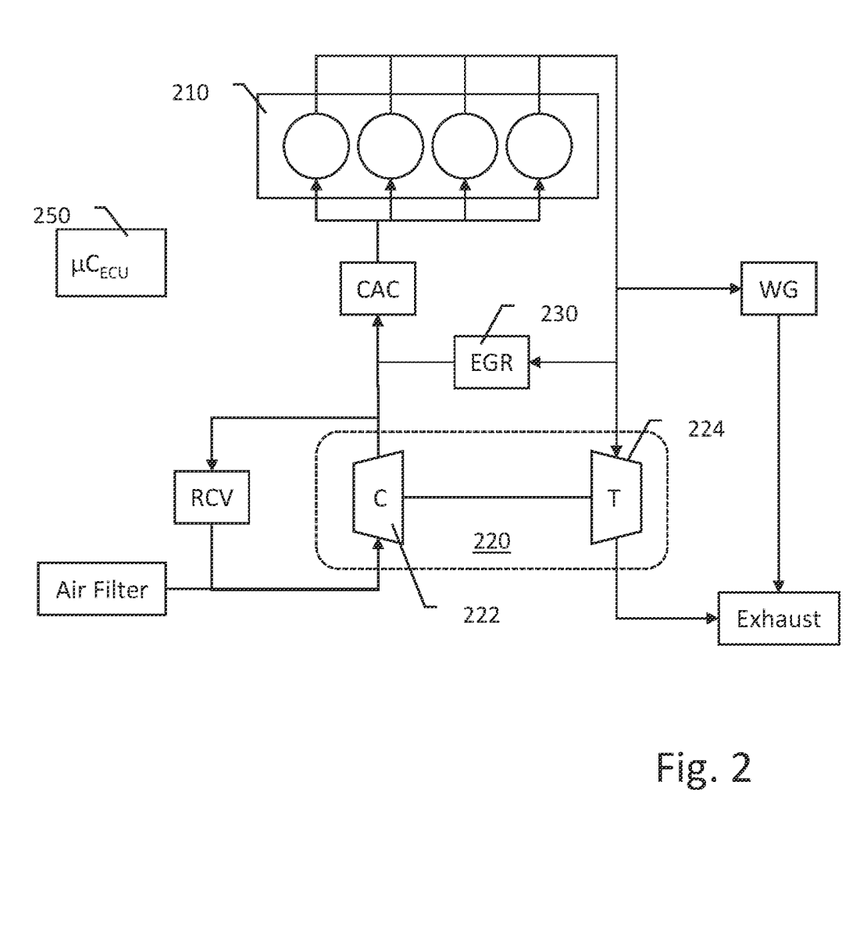
FIG. 2 shows an illustrative engine in schematic form.

Engine performance can be enhanced by compressing intake air which is fed into the engine. For example, as shown in FIG. 2, a turbocharger 220 operates using power obtained from a turbine 224 placed in the exhaust airstream of the engine 210 to drive a compressor 222 in the intake airstream. A supercharger obtains power using the mechanical output of the engine to drive a compressor in the intake airstream. Electric motor and other drive systems may be used as well to drive a compressor in the intake airstream.

Exhaust gas recirculation (EGR) shown at 230 in FIG. 2 is included in some such systems for various reasons. An EGR 230 may provide additional mass flow to the intake airstream with gasses that, having already been expelled from the engine, are inert to further combustion. In diesel engines, for example, the use of EGR 230 can reduce emissions of environmentally harmful nitrogen oxides. The EGR 230 is operated using an EGR valve, which is actuated to control the quantity of recirculating exhaust gas.

The EGR valve and other actuators associated with the engine are controlled by an engine control unit (ECU) 250. The ECU 250 can use a variety of control methodologies (proportional-integral-derivative (PID) control, model predictive control (MPC) or other control methods) to optimize engine performance, using operational, environmental and/or other factors. The control system may manage EGR valve position by determining mass flow characteristics of the exhaust gas as it is recirculated and/or the mass flow of air entering the engine.

Mass flow can be measured using, for example, orifice plates, Venturi tubes, flow nozzles, or other flow obstructing structures. By monitoring pressure on either side of an obstruction, the flow through the obstruction can be measured using equations that apply Bernoulli and other principles to measured values. For example, ISO 5167 describes and provides parameters for measuring mass flow rate in a systematic format.

However, the ISO 5167 standard and many other applications of Bernoulli's principle to measuring mass flow call for a steady state measurement. In the context of engine control, mass flow is pulsatile, rather than steady. Even with an engine operating at a steady state in terms of load and speed, perturbation of the mass flow takes place; changes in engine operating conditions can introduce significant errors. Direct application of various equations derived from known from steady-state formulae to pulsatile and otherwise varying flow results in spikes in the calculated results, requiring additional handling of the calculated results and/or leading to sub-optimal control.

New and alternative methods and systems capable of identifying and/or characterizing mass flow are desired to aid in optimized EGR use. Such solutions may find broader applicability outside of the EGR context.

Overview

The present inventors have identified a need for a solution to the problem of estimating mass flow in a pulsatile and/or variable environment.

A first illustrative, non-limiting example takes the form of a method of controlling an engine using a mass-flow computation, the engine having an exhaust gas recirculation (EGR) valve and a flow measurement device in fluid communication with the EGR valve, the flow measurement device providing a delta pressure parameter as an output, the method comprising: operating the engine using at least a first operating parameter; measuring the delta pressure parameter from the flow measurement device; determining a discharge coefficient using at least the first operating parameter of the engine and a discharge coefficient map; estimating mass flow from the delta pressure parameter using a measurement equation which incorporates the determined discharge coefficient for the flow measurement device; and adjusting EGR valve position to control engine performance using the estimated mass flow.

Additionally or alternatively, the step of estimating mass flow is performed by providing the delta pressure parameter to a discrete time extended Kalman filter configured to generate the mass flow estimate.

Additionally or alternatively, the step of estimating mass flow further includes generating at least a factor of effective area (FEA) estimate, wherein the FEA estimate is indicative of a state of the flow measurement device, the method further comprising: observing a plurality of FEA estimates from the discrete time extended Kalman filter; determining an FEA degradation curve for the flow measurement device; and predicting a time to service of the flow measurement device.

Additionally or alternatively, the step of estimating mass flow further includes generating at least a factor of effective area (FEA) estimate, wherein the FEA estimate is indicative of a state of the flow measurement device, the method further comprising: determining whether the FEA estimate has crossed a maintenance threshold; and if the FEA estimate has crossed the maintenance threshold, announcing a need for maintenance.

Additionally or alternatively, the announced need for maintenance identifies the flow measurement device.

Additionally or alternatively, the Kalman filter also takes as an input at least the first operating parameter of the engine.

Additionally or alternatively, the engine is operated using the first operating parameter and a second operating parameter, the discharge coefficient is determined using both the first and second operating parameters, and the first and second operating parameters are intake manifold pressure and engine speed.

Additionally or alternatively, the flow measurement device is one of a Venturi meter, an orifice plate, or a flow nozzle.

Still further examples take the form of an engine comprising a configurable controller adapted to perform a method as in any of the preceding examples, an exhaust output, and an exhaust gas recirculation (EGR) valve configured to controllably recirculate exhaust gas from the exhaust output to the air intake, and a flow measurement device configured to monitor air flow through the EGR valve. In some such examples, the flow measurement device is one of a Venturi meter, an orifice plate, or a flow nozzle.

A second illustrative and non-limiting example takes the form of a method of configuring a controller for an engine, the engine having an exhaust gas recirculation (EGR) valve and a flow measurement device in fluid communication with the EGR, comprising: constructing a semi-physical valve model that approximates a physics-based mass flow equation for the flow measurement device as a polynomial; isolating a delta pressure variable from the semi-physical valve model to generate a measurement equation, the measurement equation including a discharge coefficient; testing mass flow through a test measurement device and calculating the discharge coefficient for each of plurality of steady state pulsatile flow conditions, each steady state pulsatile flow condition representing an operating state for the engine; interpolating a discharge coefficient map as a variable dependent on one or more operating parameters for the engine; and configuring the controller to use the measurement equation and the discharge coefficient map to estimate mass flow through the EGR valve and to control the EGR using the estimated mass flow.

Additionally or alternatively, the controller is configured to use the measurement equation and the discharge coefficient map by: operating the engine using at least a first operating parameter; measuring the delta pressure parameter from the flow measurement device; determining a discharge coefficient using at least the first operating parameter and a discharge coefficient map; estimating mass flow from the delta pressure parameter using a measurement equation which incorporates the determined discharge coefficient for the flow measurement device; and adjusting EGR valve position to control engine performance using the estimated mass flow.

Additionally or alternatively, the controller is configured to use the measurement equation and the discharge coefficient map by: operating the engine; measuring a delta pressure variable from the flow measurement device; providing the delta pressure variable to a discrete time extended Kalman filter to estimate mass flow using the measurement equation and the discharge coefficient map, wherein the extended Kalman filter is configured to generate a factor of effective area (FEA) estimate, the FEA estimate being indicative of a state of the flow measurement device; determining an FEA degradation curve for the flow measurement device using the FEA estimate; and predicting a time to necessary maintenance of the flow measuring device using the FEA degradation curve.

Additionally or alternatively, the controller is configured to use the measurement equation and the discharge coefficient map by: operating the engine; measuring a delta pressure variable from the flow measurement device; providing the delta pressure variable to a discrete time extended Kalman filter to estimate mass flow using the measurement equation and the discharge coefficient map, wherein the extended Kalman filter is configured to generate a factor of effective area (FEA) estimate, the FEA estimate being indicative of a state of the flow measurement device; determining whether maintenance of the flow measurement device is necessary using the FEA estimate.

Still further examples take the form of an engine comprising a controller that has been configured using any of the preceding examples, an exhaust output, and an exhaust gas recirculation (EGR) valve configured to controllably recirculate exhaust gas from the exhaust output to the air intake, and a flow measurement device configured to monitor air flow through the EGR valve. In some such examples, the flow measurement device is one of a Venturi meter, an orifice plate, or a flow nozzle.

Another illustrative and non-limiting example takes the form of a configurable controller for an engine, the engine having an exhaust gas recirculation (EGR) valve and a flow measurement device in fluid communication with the EGR, the EGR valve configured to selectively allow exhaust gas to recirculate to an intake manifold of the engine, and the flow measurement device configured to provide a delta-pressure measurement, the configurable controller configured to perform the following: operating the engine using at least a first operating parameter; measuring the delta pressure parameter from the flow measurement device; determining a discharge coefficient using at least the first operating parameter of the engine and a discharge coefficient map; estimating mass flow from the delta pressure parameter using a measurement equation which incorporates the determined discharge coefficient for the flow measurement device; and adjusting EGR valve position to control engine performance using the estimated mass flow.

Additionally or alternatively, the configurable controller may be further configured such that the step of estimating mass flow is performed by providing the delta pressure parameter to a discrete time extended Kalman filter configured to generate the mass flow estimate.

Additionally or alternatively, the configurable controller may be further configured such that the step of estimating mass flow further includes generating at least a factor of effective area (FEA) estimate, wherein the FEA estimate is indicative of a state of the flow measurement device, and the configurable controller is also configured to perform the following: observing a plurality of FEA estimates from the discrete time extended Kalman filter; determining an FEA degradation curve for the flow measurement device; and predicting a time to service of the flow measurement device.

Additionally or alternatively, the configurable controller may be further configured such that the step of estimating mass flow further includes generating at least a factor of effective area (FEA) estimate, wherein the FEA estimate is indicative of a state of the flow measurement device, and the configurable controller is also configured to perform the following: determining whether the FEA estimate has crossed a maintenance threshold; and if the FEA estimate has crossed the maintenance threshold, announcing a need for maintenance.

Additionally or alternatively, the configurable controller may be further configured such that the announced need for maintenance identifies the flow measurement device.

Additionally or alternatively, the configurable controller may be further configured such that the Kalman filter also takes as an input at least the first operating parameter of the engine.

Additionally or alternatively, the configurable controller may be configured to: operate the engine using the first operating parameter and a second operating parameter; and determine the discharge coefficient determined using both the first and second operating parameters; wherein the first and second operating parameters are intake manifold pressure and engine speed.

Still further examples take the form of an engine comprising the configurable controller of any of the preceding examples, an exhaust output, and an exhaust gas recirculation (EGR) valve configured to controllably recirculate exhaust gas from the exhaust output to the air intake, and a flow measurement device configured to monitor air flow through the EGR valve. In some such examples, the flow measurement device is one of a Venturi meter, an orifice plate, or a flow nozzle.

This overview provides an introduction to the subject matter herein. It is not intended to provide an exclusive or exhaustive explanation. The detailed description is included to provide further details and examples.

BRIEF DESCRIPTION OF THE DRAWINGS

The drawings illustrate generally, by way of example, but not by way of limitation, various examples discussed in the present document.

DETAILED DESCRIPTION

Figure 1:
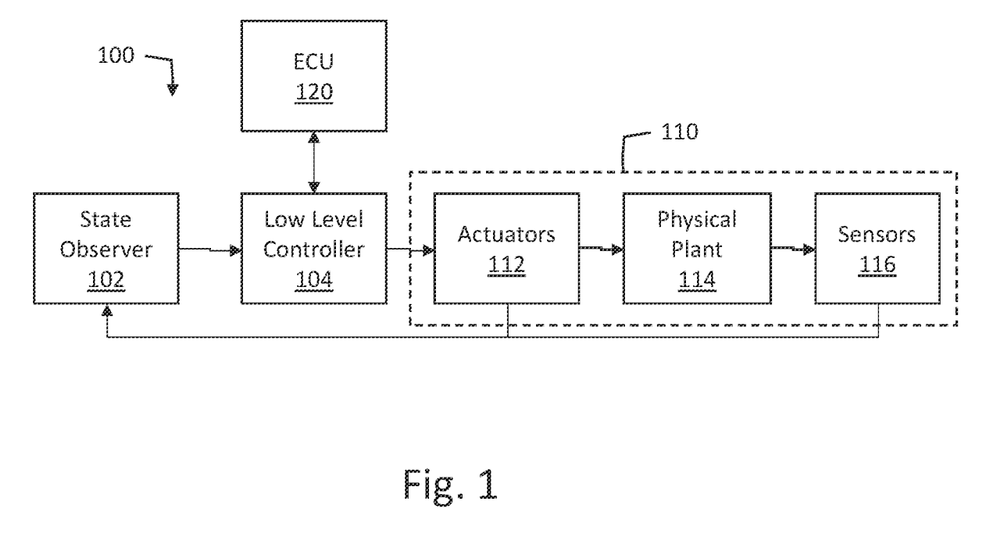
FIG. 1 shows a model of an operational control system.

FIG. 1 shows a model of an operational control system. A control apparatus is shown at 100 and includes a state observer 102, which feeds a set of current state variables to a low level controller 104. The low level controller calculates a solution for process parameters that can be applied to a set of actuators 112, which in turn control operation of the physical plant 114. The set of actuators may control, for example and without limitation, fuel or other injectors, variable nozzle turbine position, engine brake, after-treatment (including exhaust), throttle position, exhaust gas recirculation (EGR), an electric motor (in an electric turbocharger for example, which may be controlled via pulse width modulation (PWM)), waste gate (WG) position, charge air cooler functions, position of the recirculation valve, position of a variable compressor geometry actuator; and other valves, nozzles, parts and positions in the system.

The physical plant 114 may be, for example and without limitation, an internal combustion engine, whether diesel or gasoline. A plurality of sensors 116 are provided. Sensors 116 may include, for example, and without limitation, sensors detecting manifold absolute pressure (MAP), mass air flow (MAF), EGR flow, turbo speed, NOx, engine speed, fuel quantity, boost pressure, etc. Additional monitored parameters may include, for example, torque output of the electric motor of an electric turbocharger, waste gate (WG) normalized opening, recirculation valve (RCV) normalized opening, and/or a variable geometry compressor position and configuration. Sensors 116 may in some examples also sense user inputs, such as pressure on brake or acceleration pedals and/or steering wheel position (and changes to such). Sensors 116 may be configured to sample the underlying parameter being sensed and provide the result of such samples to the state observer 102. The state observer 102 may record the sensor outputs and actuator positions over time to provide history of the system operation.

The state observer 102 and low level controller 104 may be, for example, implemented in a microcontroller configured to operate on a set of stored instructions for performing a state observation and optimization routine. In another example, an application specific integrated circuit (ASIC) may provide state observer functions, which can include the capture or accumulation of data from the actuators 112 and/or sensors 116, which in turn may be read periodically by a microcontroller. The low level controller 104 may be configured with circuitry, logic, and/or stored instruction sets for performing a control and/or optimization calculation using, for example, model predictive control (MPC) cost functions, linear quadratic regulator (LQR) control, proportional integral derivative (PID) control, or other control methods.

The low level controller 104 may be integrated into, or provided separately from, an on-board diagnostics system (not shown) that can be used to record diagnostic variables and present them, as needed to the user or to store for later analysis. The low level controller 104 is shown operatively linked to the overall engine control unit (ECU) 120. Separate blocks 102, 104 and 120 are shown, however, it should be understood that this architecture may be integrated into a single processor or microcontroller, if desired. In other examples, separate ASIC, state machine(s), microcontroller(s) or microprocessors may be provided for each block 102, 104 and 120, as desired.

The control solution calculated by the low level controller 104 is used to generate one or more outputs, which in turn are used to control the actuators 112 to operate the physical plant 114. Generally speaking the aim may be to minimize the distance of operating variables from one or more target output values for the controllable outputs or physical plant operating characteristics. For example, the targets may be any of target turbocharger speed, target boost pressure, target pressure difference over the compressor, target air mass flow or a combination thereof. With MPC functions, the distance to target or reference values for the one or more output values (or resulting operating characteristics) is minimized, thus optimizing performance. As an example, an MPC cost function formation may be as shown in Equation 1:

$$J_{MPC} = \min \Sigma_{k=1}^{P} \|y_{r,k} - y_k\|_{W_1} + \|u_{d,k} - u_k\|_{W_2},$$ [Eq. 1]

Where $u_{d,k}$ corresponds to the desired profile for the manipulated variable, $u_k$ stands for the manipulated variable, k denotes discrete time instance, and P stands for the prediction horizon of the predictive controller. In this example, $y_{r,k}$ and $y_k$ represent the output reference and measured value, respectively, and $W_1$ and $W_2$ specify weighting terms. The MPC cost function is minimized in operation in order to provide optimal control to the physical plant, and the low level controller 104 may use MPC accordingly.

In another example, a PID controller can be used to account for each of proportional, integral, and derivative differences from a target operating point. A target operating point for PID control may use a single value, such as compressor boost pressure, or may use a plurality of values such as compressor speed and compressor boost pressure, while controlling other factors (actuator positions, for example) to direct operations to maintain such target(s). The proportional difference may indicate current state, integral difference may identify a process shift over time, and derivative difference may indicate the direction of changes in operation. With PID control, a proportional difference is minimized while monitoring to ensure that the integral and derivative differences do not indicate changing performance which may, after further iterations, cause the proportional difference to increase. The control parameters output to the actuators 112 are, for a PID controller, adjusted to reduce or minimize the distance of actual performance from one or more targets on an iterative basis. PID control may incorporate multiple different target operating characteristics. The low level controller 104 may use PID control instead of MPC, for example. LQR control may be used instead, if desired, applying similar concepts.

One of the sensor inputs that can be used by the state observer 102, low level controller 104 and/or the ECU 120 is a delta pressure measurement from a flow measurement device. For example, flow obstructing measurement devices return a specific value, the change in pressure measured between two points in the measurement device. This change in pressure is represented in the following description as $\Delta\rho$.

Figure 3:
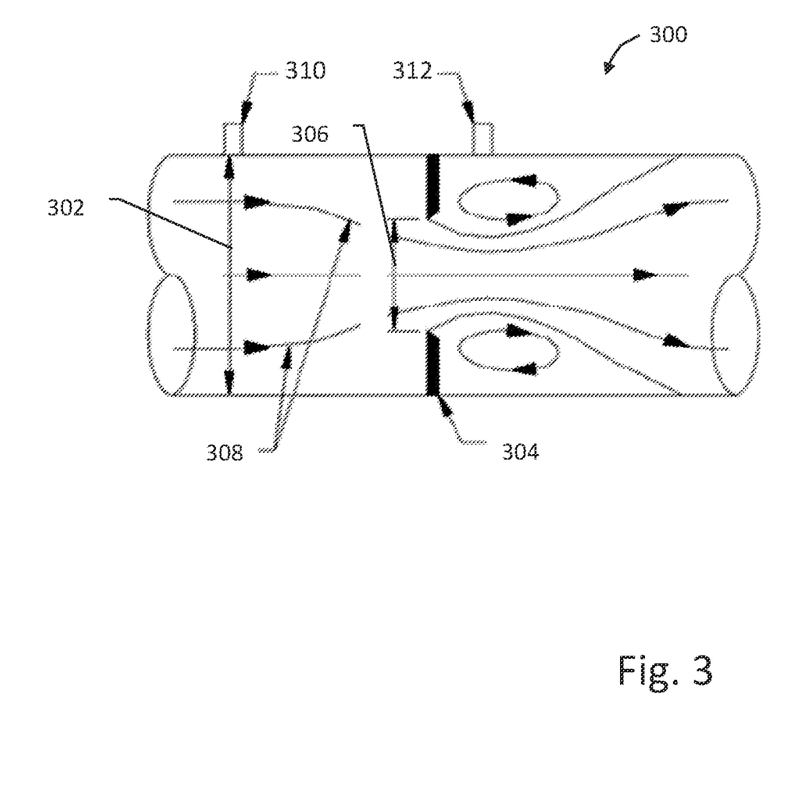
FIGS. 3-4 show illustrative flow measurement devices.
Figure 4:
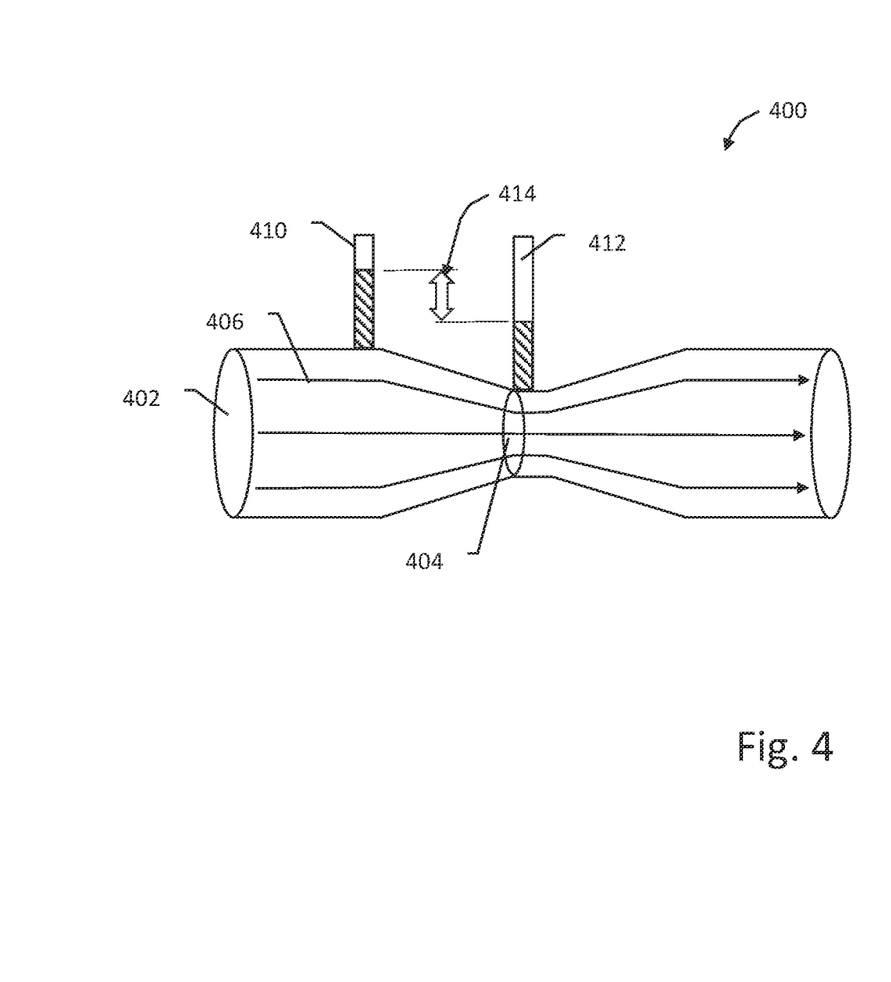

FIGS. 3 and 4 show two obstructing flow measurement devices and illustrate how $\Delta\rho$ is measured. For example, FIG. 3 shows an orifice plate flow measurement device. The orifice plate is shown at 304 inside a tube 300 having an inner diameter 302. The orifice plate has an inner opening with a reduced diameter 306 relative to the tube 300. Flow lines are shown at 308, illustrating how a fluid passes through the device with the obstruction from the orifice plate 304. Pressure measurements are taken at locations 310 and 312, with location 310 upstream of the orifice place 304 and location 312 downstream of the orifice plate. The difference in pressure between the two locations 310, 312 can then be used to calculate mass flow.

FIG. 4 shows a Venturi tube flow measurement device. Here rather than an obstructing plate, the tube 400 narrows from a first inner diameter at 402 to a reduced inner diameter at 404. Flow lines are shown at 406 illustrating how a fluid moving through the flow measurement device is directed. Pressure is measured at locations 410 and 412, and the delta pressure measurement is physically shown at 414 as the difference between the two measurements at locations 410, 412.

Other flow measurement devices with different and/or arbitrary shape are also known. For use herein, the flow measurement device returns a delta pressure measurement ($\Delta\rho$). The use of this type of flow measurement device is well known, and varies depending on the compressibility of the fluid as well as other factors or assumptions. Most analyses of these devices assume steady state of the mass flow to allow the $\Delta\rho$ measurement to be used to calculate or estimate mass flow.

Rather than relying on formulae developed for a steady state flow condition, in some illustrative embodiments, a pulsating flow model is created and then implemented by a system that uses estimated mass flow to control system operations. For example, the system may control an engine by, at least in part, controlling mass flow through an EGR including monitoring such mass flow using a flow measurement device. In a calibration stage, an operating-point dependent discharge coefficient is determined for the obstructing flow measurement device (any of an orifice plate, Venturi tube, flow nozzle, or other arbitrarily shaped flow obstructing device may be used) by mapping across various steady state pulsating flow operating states. The operating states to be mapped may include those likely for use in steady state operation of the underlying engine system. With a map of the discharge coefficient built, the discharge coefficient may be calculated or determined by reference to the discharge coefficient map using one, two, or more operating parameters of the engine as inputs. In an example, when creating the discharge coefficient map, various operating states are tested using combinations of intake manifold pressure and engine speeds. The discharge coefficient can be mapped at several operating states, with the regions between operating state combinations calculated by interpolation.

In an example, the mass-flow equation is inverted with respect to $\Delta\rho$, and the $\Delta\rho$ term is isolated from the rest of the equation. Inversion may be used if the mass flow model assumes a medium lacking internal energy changes and which is non-compressible, where the mass flow equation would be:

$$\dot{m} = \frac{C_d}{\sqrt{1-\beta^4}} A_t Y \sqrt{2\rho\Delta\rho}$$

Here solving for $\Delta\rho$ is relatively simple after inverting the equation. However, the flow equations become more complex without the assumptions of constant internal energy and/or non-compressibility. Rather than inverting the formula and solving for $\Delta\rho$, a semi-physical model, with a rational polynomial structure, is used to approximate the purely-physics based equations, and the inversion is performed using the semi-physical model.

The result may be a non-linear equation, which can then be solved using non-linear equation solver by, for example, use of Gauss-Newton, Newton-Raphson, Extended Kalman filter, or other model based filtering techniques. By using a model based solution, measurement error, and transient peaks, can be segregated from the data.

In an illustrative example, the following rational polynomial equation may be used:

$$\text{Model}_{sp\_valve} = a_1 * \Delta\rho * m + a_2 * m * P_i + a_3 * Ti * \Delta\rho * m + a_4 * Ti * m * P_i - a_5 * A * C_d * \Delta\rho * P_i - a_6 * A * C_d * Ti * \Delta\rho * Pi$$

Where $\Delta\rho$ is the delta pressure measurement, m is the mass flow, $T_i$ is the upstream temperature, $P_i$ is the upstream pressure, A is the orifice area, $C_d$ is the discharge coefficient, and the $a_n$ coefficients may be as follows:

$a_1$=8.3278
$a_2$=0.74485
$a_3$=5.9971
$a_4$=0.53638
$a_5$=0.59983
$a_6$=0.045775

Such coefficients may vary depending on the flow measurement device and other system componentry/design. In some examples, the orifice area, A, may be a variable that references a calculated obstruction of the orifice, where the degree of obstruction can be estimated using processes shown below.

Figure 5:
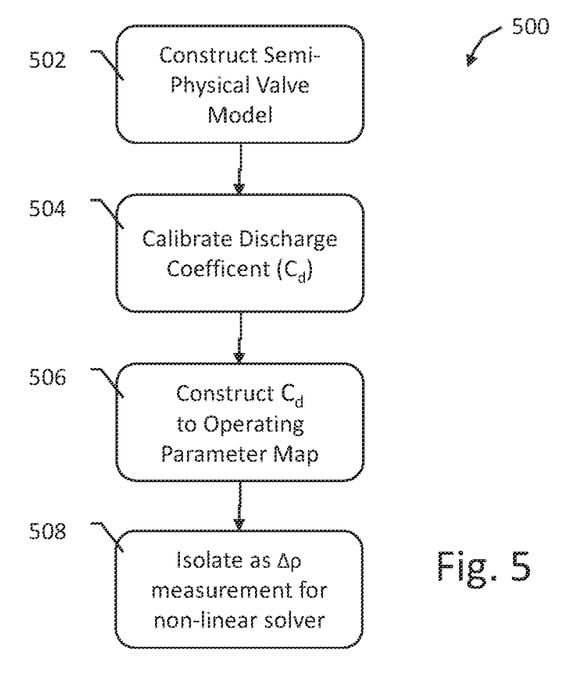
FIG. 5 shows an illustrative method.

FIG. 5 shows an illustrative method. The method 500 of FIG. 5 may be used in configuring a controller for a system. A semi-physical valve model is constructed at 502, and a discharge coefficient variable $C_d$ is calibrated at block 504. In some examples, $C_d$ is a variable dependent on one or more operating parameters of the system, as described relative to FIG. 6, and so a map of $C_d$ to the operating parameter(s) is generated as indicated at 506. The delta pressure variable can then be isolated from the rest of the equation, followed by the application of a non-linear equation solver, as indicated at 508, to solve for the unknown mass flow. A wide variety of commercially available software products provide tools for solving non-linear equations (Matlab, for example).

Figure 6:
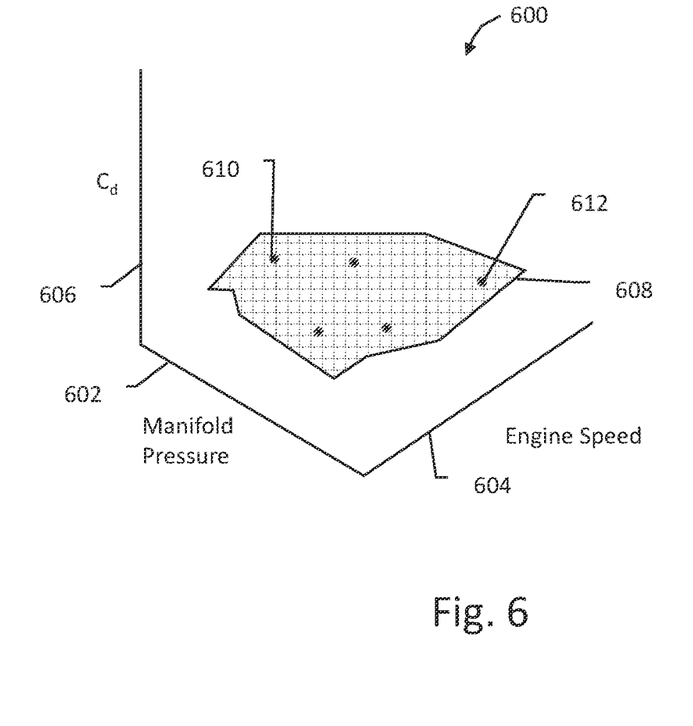
FIG. 6 shows an illustrative discharge coefficient map.

FIG. 6 shows an illustrative discharge coefficient map. In the example map 600, manifold pressure serves as one axis 602, engine speed is another axis 604, and the discharge coefficient, Ca, is illustrated along a third axis 606. Test points 610, 612 are generated using various operating parameters, and a surface 608 is defined by interpolating between test points 610, 612. The accuracy of the mapping can be improved by adding more test points; in some examples 20 to 50 test points can be provided, or more or less. In some examples the map 600 can be generated for a particular implementation, such as a vehicle or other engine configuration, and stored for that particular implementation. In other examples, a map 600 can be generated for a standardized configuration, such as when a fleet of trucks, airplanes or cars, or a class of generators or other engines, uses the same equipment in each configuration.

In the example shown in FIG. 6, the discharge coefficient is determined using two operating parameters for the engine. In other examples, a single operating parameter for the engine may be used, such as engine speed or manifold pressure, or a different parameter such as exhaust gas pressure. In still other examples, more than two operating parameters may be used to determine the discharge coefficient. It should be understood that each example herein possesses the flexibility to use one, two, or three or more engine operating parameters for determining the discharge coefficient using a mapping. In still other examples, a polynomial formula may be calculated for determining the discharge coefficient, rather than determining a map, avoiding the need to store a look-up table.

In some examples, the map 600 is generated or calibrated directly using the engine or engine design to be modeled. For example, additional sensors may be provided in the tested engine, such as precision laser-based flowmeters. A real-world implementation may be used. In other examples, the map 600 can be generated on a test station, if desired. In some examples, a coefficient mapping can be generated with specialized equipment using a predictable and homogenous medium ($CO_2$, for example) in an emulation. In some examples, laser-based flowmeter data may be used to generate a map 600, using a test-setup rather than a real-world implementation. When generating a discharge coefficient map, for example, the variation of engine speed may be modeled for testing purposes as a pulsating flow of a given frequency, which high frequency pulsation equated to higher engine speed, for example; the manifold pressure in this example can be modeled for test purposes by applying back pressure at the outlet of the flow measuring device. Thus conditions at the input and output of the flow measurement device can be simulated for mapping purposes.

In an example, the map 600 is calibrated as follows:

1. Generate semi-physical valve model that approximates the physics-based flow equation and isolate mass-flow from the equation $0=\text{Model}_{sp\_valve}$; in the isolated mass-flow model $m(\Delta p, p_i, A, C_d=1)$, for calibration initially set Cd to 1

2. Calibrate the discharge coefficient as $$C_d = \frac{\text{mass-flow data}}{m(\Delta p, p_i, A, C_d = 1)}$$

with unit discharge coefficient in the $\text{Model}_{sp\_valve}$ model. Here, mass-flow data is measured by, for example, using an EGR $CO_2$-based mass-flow method.

3. Represent the discharge coefficient in interpolated 2D map as an operating point dependent parameter. For example, for EGR flow measurement, the operating point is given by the intake manifold pressure and engine speed.

4. Use calibrated Cd map in $\text{Model}_{sp\_valve}$ model

5. Isolate delta pressure variable out of $\text{Model}_{sp\_valve}$ equation to serve as the measurement equation (e,g, for the discrete-time Extended Kalman Filter (EKF)) in a rational polynomial form. In an illustrative example, dp=(−0.089441*m*pi−0.064409*Ti*m*pi)/(m+0.72012*Ti*m−0.072028*A*Cd*pi−0.0054967*A*Cd*Ti*pi)

Steps 1-5 serve as one illustrative example.

Figure 7A:
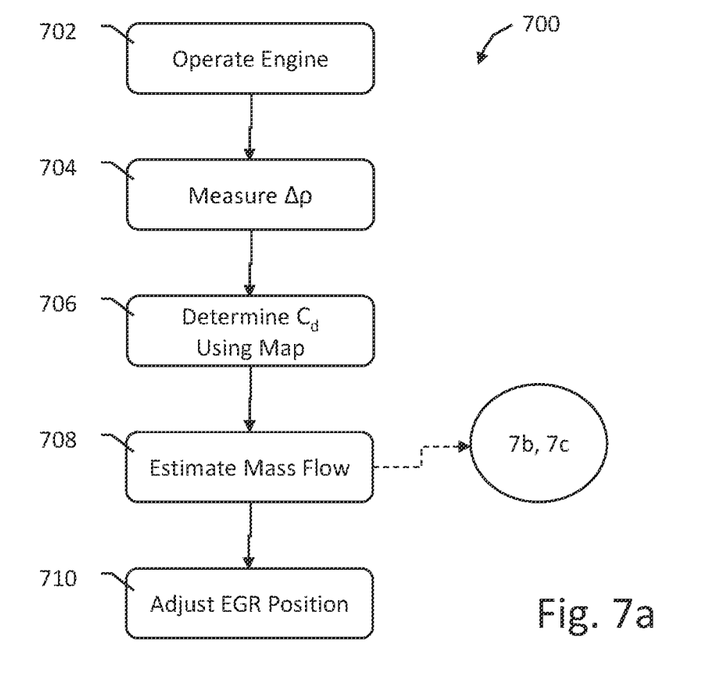
FIGS. 7a-7c show illustrative methods.

FIGS. 7a-7c show illustrative methods. FIG. 7a shows an example method at 700. The engine is operated at 702, and a measurement of $\Delta p$ is sampled or otherwise taken from the flow measurement device, at 704. The discharge coefficient $C_d$ is then determined using the operating state of the engine and the discharge coefficient map, at 706. Mass flow is then estimated at 708 using the equation generated above in FIG. 5. In some examples a discrete time extended Kalman filter is used to estimate mass flow at block 708, though other calculations may be used instead. Finally, in the method shown in FIG. 7a, a controllable actuator associated with the engine is manipulated or otherwise adjusted. In the example shown, the EGR valve position is adjusted at 710, which may adjust engine performance toward an optimization target or target setpoint, for example. While the example specifically calls out the EGR valve position, any other actuator or valve may be adjusted, alone or in combination with one or more other actuators, parameters, etc.

Figure 7B:
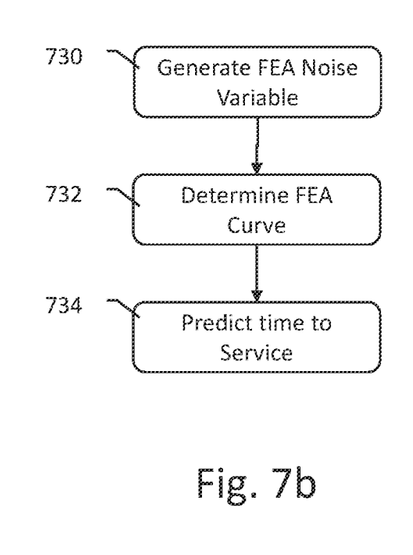
Figure 7C:
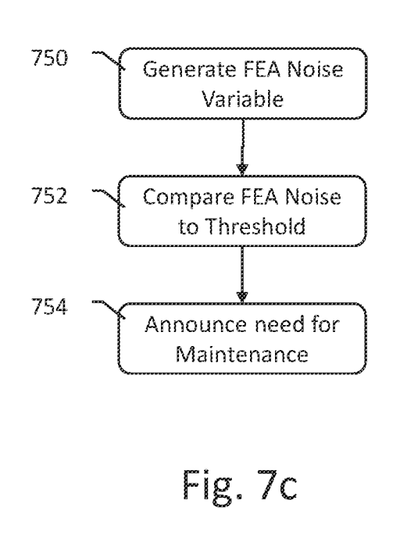

In addition to, or as alternatives to, the adjustment or actuation at 710, the state of the system may be monitored, modeled, or flagged, using methods in FIGS. 7b and/or 7c.

FIG. 7b illustrates an example where the maintenance state of the system is determined and projected forward in time. Here, the calculations that are performed to determine mass flow in FIG. 7A may include as an additional variable in the output a Factor of Effective Area (FEA), as may be the case when a Kalman filter is used to calculate mass flow (in general a Kalman filter returns an estimated variable and one or more noise factors associated with the variable; the noise factors can be isolated and associated with specific elements of a system). The FEA is generated or obtained at block 730, and an FEA Curve is generated at 732. The FEA Curve can be referenced to time, and can then be used to predict a time to servicing at 734. For example, the flow measurement device (such as a Venturi meter) may become obstructed by soot or other fouling factors over time; in other examples the flow measurement device may be subject to wear (as with an obstructing flow meter which may demonstrate both soot accumulation and wear). The time to service can be predicted by extrapolating from the calculated FEA over time.

FIG. 7c shows another example. Here, the FEA is generated or obtained at 750. The FEA can then be compared to a threshold at 752. If the threshold is met at 752, the system can announce a need for maintenance at 754. The need for maintenance can be communicated off vehicle, for example to a centralized server or a fleet manager, or may be reported to a user of the vehicle itself.

The above detailed description includes references to the accompanying drawings, which form a part of the detailed description. The drawings show, by way of illustration, specific embodiments in which the innovation can be practiced. These embodiments are also referred to herein as "examples." In this document, the terms "a" or "an" are used, as is common in patent documents, to include one or more than one, independent of any other instances or usages of "at least one" or "one or more." Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. Some examples can include elements in addition to those shown or described. The present inventors also contemplate examples using any combination or permutation of those elements shown or described (or one or more aspects thereof), either with respect to a particular example (or one or more aspects thereof), or with respect to other examples (or one or more aspects thereof) shown or described herein.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic or optical disks, magnetic cassettes, memory cards or sticks, random access memories (RAMs), read only memories (ROMs), and the like.

The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, innovative subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of protection should be determined with reference to the appended claims, along with the full scope of equivalents to which such claims are entitled.

What is claimed is:

1. A method of managing maintenance in an engine, the engine including an intake manifold and operating at an engine speed, the engine having a flow measurement device that provides a delta pressure parameter as an output, the method comprising:
    operating the engine using at least a first operating parameter which includes at least one of an intake manifold pressure or the engine speed;
    measuring the delta pressure parameter from the flow measurement device;
    determining a discharge coefficient using at least the first operating parameter and a discharge coefficient map;
    estimating mass flow from the delta pressure parameter using a measurement equation which incorporates the determined discharge coefficient for the flow measurement device; and
    wherein the step of estimating mass flow further includes generating at least a factor of effective area (FEA) estimate, wherein the FEA estimate is indicative of a state of the flow measurement device, the method further comprising:
        observing a plurality of FEA estimates over time;
        determining an FEA degradation curve for the flow measurement device;
        predicting a time to service of the flow measurement device; and
        scheduling service on the flow measurement device responsive to the predicted time to service.

2. The method of claim 1 wherein the step of estimating mass flow is performed by providing the delta pressure parameter to a discrete time extended Kalman filter configured to generate the mass flow estimate.

3. The method of claim 2 wherein the Kalman filter also takes as an input at least the first operating parameter of the engine.

4. The method of claim 1 wherein the engine is operated using the first operating parameter and a second operating parameter, the discharge coefficient is determined using both the first and second operating parameters, and the first operating parameter is intake manifold pressure, and the second operating parameter is engine speed.

5. The method of claim 1 wherein the flow measurement device is one of a Venturi meter, an orifice plate, or a flow nozzle.

6. A method of managing maintenance in an engine, the engine including an intake manifold and operating at an engine speed, the engine having a flow measurement device that provides a delta pressure parameter as an output, the method comprising:
    operating the engine using at least a first operating parameter which includes at least one of an intake manifold pressure or the engine speed;
    measuring the delta pressure parameter from the flow measurement device;
    determining a discharge coefficient using at least the first operating parameter and a discharge coefficient map;
    estimating mass flow from the delta pressure parameter using a measurement equation which incorporates the determined discharge coefficient for the flow measurement device; and
    wherein the step of estimating mass flow further includes generating at least a factor of effective area (FEA) estimate, wherein the FEA estimate is indicative of a state of the flow measurement device, the method further comprising:
        determining whether the FEA estimate has crossed a maintenance threshold; and
        if the FEA estimate has crossed the maintenance threshold, announcing a need for maintenance.

7. The method of claim 6 wherein the announced need for maintenance identifies the flow measurement device.

8. The method of claim 6 wherein the step of estimating mass flow is performed by providing the delta pressure parameter to a discrete time extended Kalman filter configured to generate the mass flow estimate.

9. The method of claim 8 wherein the Kalman filter also takes as an input at least the first operating parameter of the engine.

10. The method of claim 6 wherein the engine is operated using the first operating parameter and a second operating parameter, the discharge coefficient is determined using both the first and second operating parameters, and the first and second operating parameters are intake manifold pressure and engine speed.

11. The method of claim 6 wherein the flow measurement device is one of a Venturi meter, an orifice plate, or a flow nozzle.

12. A configurable controller for an engine, the engine having an intake manifold and operable at an engine speed, a flow measurement device configured to provide a delta-pressure measurement obtained from fluid flowing through the flow measurement device, the configurable controller configured to perform the following:

operating the engine using at least a first operating parameter;

measuring the delta pressure parameter from the flow measurement device;

determining a discharge coefficient using at least the first operating parameter of the engine and a discharge coefficient map;

estimating mass flow from the delta pressure parameter using a measurement equation which incorporates the determined discharge coefficient for the flow measurement device; and     wherein the step of estimating mass flow further includes generating at least a factor of effective area (FEA) estimate, wherein the FEA estimate is indicative of a state of the flow measurement device, the method further comprising:

determining whether the FEA estimate has crossed a maintenance threshold; and     if the FEA estimate has crossed the maintenance threshold, announcing a need for maintenance;

wherein the at least a first operating parameter includes at least one of an intake manifold pressure or the engine speed.

13. The configurable controller of claim 12, wherein the configurable controller is configured such that the announced need for maintenance identifies the flow measurement device.

14. The configurable controller of claim 12, further configured such that the step of estimating mass flow is performed by providing the delta pressure parameter to a discrete time extended Kalman filter configured to generate the mass flow estimate.

15. The configurable controller of claim 14, wherein the Kalman filter also takes as an input at least the first operating parameter of the engine.

16. The configurable controller of claim 12 wherein the configurable controller is configured for using a Venturi meter, an orifice plate, or a flow nozzle as the flow measurement device.

17. The configurable controller of claim 12, further wherein the configurable controller is configured to:

operate the engine using the first operating parameter and a second operating parameter; and     determine the discharge coefficient using both the first and second operating parameters;

wherein the first and second operating parameters are intake manifold pressure and engine speed.

18. An engine comprising the configurable controller of claim 12, an air intake, an exhaust output, and a flow measurement device for measuring air flow at a selected location in the engine, wherein the flow measurement device is one of a Venturi meter, an orifice plate, or a flow nozzle.

* * * * *